United States Patent
Sarh et al.

(10) Patent No.: US 8,832,940 B2
(45) Date of Patent: Sep. 16, 2014

(54) ELECTROMAGNETIC CLAMPING DEVICE

(71) Applicant: The Boeing Company, Chicago, IL (US)

(72) Inventors: Branko Sarh, Huntington Beach, CA (US); Harry Asada, Lincoln, MA (US); Manas Chandran Menon, Boston, MA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 13/920,087

(22) Filed: Jun. 18, 2013

(65) Prior Publication Data

US 2013/0263431 A1    Oct. 10, 2013

Related U.S. Application Data

(62) Division of application No. 12/263,766, filed on Nov. 3, 2008, now Pat. No. 8,490,955.

(60) Provisional application No. 61/098,370, filed on Sep. 19, 2008.

(51) Int. Cl.
| | | |
|---|---|---|
| *B21D 39/03* | (2006.01) | |
| *B23P 11/00* | (2006.01) | |
| *B23Q 7/00* | (2006.01) | |
| *H01F 7/06* | (2006.01) | |
| *B25B 11/00* | (2006.01) | |
| *B23B 31/28* | (2006.01) | |
| *H01F 7/20* | (2006.01) | |
| *B23B 39/00* | (2006.01) | |
| *B23B 47/00* | (2006.01) | |
| *B23B 49/00* | (2006.01) | |
| *B21J 15/28* | (2006.01) | |
| *B21J 15/42* | (2006.01) | |
| *B23Q 3/154* | (2006.01) | |
| *B21J 15/14* | (2006.01) | |
| *B23G 1/00* | (2006.01) | |

(52) U.S. Cl.
CPC .............. *B23Q 3/1543* (2013.01); *B21J 15/28* (2013.01); *B21J 15/42* (2013.01); *B25B 11/002* (2013.01); *B23Q 3/1546* (2013.01); *B21J 15/142* (2013.01); *B21J 15/14* (2013.01)

USPC .............. 29/897.2; 29/428; 29/559; 29/607; 269/8; 279/128; 335/285; 335/289; 335/290; 335/291; 335/292

(58) Field of Classification Search
USPC ............. 29/897.2, 428, 559, 607, 609; 269/8; 408/76; 279/128; 335/285, 289–294
See application file for complete search history.

(56) References Cited

U.S. PATENT DOCUMENTS

| | | |
|---|---|---|
| 675,323 A | 5/1901 | Clark |
| 1,548,793 A | 8/1925 | Bing |

(Continued)

FOREIGN PATENT DOCUMENTS

| | | |
|---|---|---|
| EP | 0585494 A1 | 3/1994 |
| EP | 1022089 A2 | 7/2000 |

(Continued)

OTHER PUBLICATIONS

International Search Report and Written Opinion of the International Searching Authority, dated Dec. 12, 2009, regarding Application No. PCT/US2009/057487, 12 pages.

(Continued)

*Primary Examiner* — Essama Omgba
*Assistant Examiner* — Darrell C Ford
(74) *Attorney, Agent, or Firm* — Yee & Associates, P.C.

(57) ABSTRACT

An electromagnetic clamping system contains a housing, numerous permanent magnets, numerous low friction surfaces having a number of wheels, an end effector, an electromagnetic clamping device, first, second, and third coil systems, and a core. The end effector performs operations on a workpiece. The electromagnetic clamping device has an activated state and a deactivated state. The electromagnetic clamping device further includes a first coil system generating a first magnetic field causing normal forces on the permanent magnet unit and the clamping device; a second coil system generating a second magnetic field causing side forces on the permanent magnet unit; and a third coil system generating a third magnetic field causing a rotational force on the permanent magnet unit. The core provides access to the workpiece surface for performing operations thereon; and concentrates forces from a number of magnetic fields on the core surface contacting the workpiece surface.

15 Claims, 12 Drawing Sheets

(56) References Cited

U.S. PATENT DOCUMENTS

| | | |
|---|---|---|
| 1,673,719 A | 6/1928 | Howard |
| 1,970,922 A | 8/1934 | Grant |
| 2,421,716 A * | 6/1947 | Rose ................................ 219/81 |
| 2,561,769 A | 7/1951 | Anderson |
| 2,729,344 A | 1/1956 | Birchall |
| 2,823,340 A | 2/1958 | Pierce |
| 3,209,891 A | 10/1965 | Littwin |
| 3,491,995 A | 1/1970 | Taraba |
| 3,553,612 A | 1/1971 | Zimmer |
| 4,227,162 A | 10/1980 | Fujita et al. |
| 5,047,742 A | 9/1991 | Hsu |
| 5,145,227 A * | 9/1992 | Monford, Jr. ................. 294/65.5 |
| 5,971,379 A * | 10/1999 | Leon, Jr. ............................ 269/8 |
| 5,998,889 A | 12/1999 | Novak |
| 6,005,460 A * | 12/1999 | Garrigus et al. .............. 335/216 |
| 6,221,297 B1 | 4/2001 | Lanoue et al. |
| 6,229,422 B1 | 5/2001 | Pignataro |
| 6,357,101 B1 * | 3/2002 | Sarh et al. .................. 29/407.09 |
| 6,371,274 B1 | 4/2002 | Ditter et al. |
| 6,536,100 B2 | 3/2003 | Sarh et al. |
| 6,644,637 B1 | 11/2003 | Shen et al. |
| 6,652,252 B2 | 11/2003 | Zabar |
| 6,670,807 B2 * | 12/2003 | Cox ........................ 324/207.26 |
| 6,762,516 B2 | 7/2004 | Maruyama |
| 6,837,160 B2 | 1/2005 | Leppanen et al. |
| 6,875,964 B2 | 4/2005 | Golovashchenko et al. |
| 6,905,291 B2 | 6/2005 | Day et al. |
| 6,917,131 B2 * | 7/2005 | Cheung ........................ 310/90.5 |
| 7,023,312 B1 | 4/2006 | Lanoue et al. |
| 7,088,210 B2 | 8/2006 | Day et al. |
| 7,148,776 B2 * | 12/2006 | Day et al. ....................... 335/289 |
| 7,148,782 B2 | 12/2006 | Hirzel |
| 7,162,789 B2 | 1/2007 | Day et al. |
| 7,269,894 B2 | 9/2007 | Day et al. |
| 7,404,512 B2 | 7/2008 | Baumann et al. |
| 7,647,692 B2 | 1/2010 | Lanoue et al. |
| 7,671,712 B2 | 3/2010 | Elliot et al. |
| 7,793,900 B2 | 9/2010 | Feng et al. |
| 7,843,296 B2 * | 11/2010 | Fullerton et al. .............. 335/306 |
| 7,999,645 B2 | 8/2011 | Sarda |
| 7,999,919 B2 * | 8/2011 | Miyajima et al. ............... 355/75 |
| 8,031,038 B2 | 10/2011 | Kimura |
| 8,106,735 B2 | 1/2012 | Li |
| 8,111,123 B2 | 2/2012 | Lim et al. |
| 8,628,529 B2 * | 1/2014 | Aldridge et al. ................ 606/52 |
| 2002/0050043 A1 | 5/2002 | Sarh et al. |
| 2002/0190826 A1 | 12/2002 | Molteni |
| 2003/0132746 A1 * | 7/2003 | Cox ........................ 324/207.26 |
| 2004/0016097 A1 * | 1/2004 | Bloch et al. ................... 29/407.1 |
| 2004/0061585 A1 * | 4/2004 | Dunning et al. ............... 336/182 |
| 2004/0088843 A1 | 5/2004 | Day et al. |
| 2005/0092817 A1 | 5/2005 | Baumann et al. |
| 2005/0093666 A1 * | 5/2005 | Miyajima et al. .............. 335/285 |
| 2005/0153818 A1 * | 7/2005 | Hazlehurst et al. ............... 483/1 |
| 2005/0237146 A1 | 10/2005 | Hirzel |
| 2006/0214756 A1 | 9/2006 | Elliot et al. |
| 2007/0034757 A1 | 2/2007 | Heard |
| 2008/0155807 A1 * | 7/2008 | Toh et al. .................... 29/525.01 |
| 2009/0039989 A1 | 2/2009 | Reuber |
| 2009/0283946 A1 * | 11/2009 | Cai et al. ............................ 269/8 |
| 2010/0071192 A1 | 3/2010 | Sarh et al. |
| 2011/0018182 A1 | 1/2011 | Day et al. |
| 2012/0062866 A1 | 3/2012 | Binnard et al. |
| 2014/0111033 A1 * | 4/2014 | Yang ........................ 310/12.17 |

FOREIGN PATENT DOCUMENTS

| | | |
|---|---|---|
| EP | 1132164 A2 | 9/2001 |
| FR | 2722437 A1 | 1/1996 |
| GB | 336105 A | 10/1930 |
| GB | 2002072 A | 2/1979 |
| GB | 2256749 A | 12/1992 |
| WO | WO9626038 A1 | 8/1996 |

OTHER PUBLICATIONS

Combined Search and Examination Report, dated Nov. 9, 2010, regarding Application No. GB1011723.2, 7 pages.

Office Action, dated Aug. 17, 2012, regarding U.S. Appl. No. 12/263,766, 16 pages.

Notice of Allowance, dated Mar. 6, 2013, regarding U.S. Appl. No. 12/263,766, 12 pages.

Office Action, dated Sep. 6, 2012, regarding U.S. Appl. No. 12/773,209, 15 pages.

Final Office Action, dated May 21, 2013, regarding U.S. Appl. No. 12/773,209, 16 pages.

Office Action, dated Nov. 29, 2013, regarding U.S. Appl. No. 12/773,209, 23 pages.

* cited by examiner

ELECTROMAGNETIC CLAMPING DEVICE

CROSS-REFERENCE TO RELATED APPLICATION

This application is a divisional application of U.S. application Ser. No. 12/263,766, entitled "Electromagnetic Clamping Device," filed Nov. 3, 2008, status, Allowed, which claims the benefit of the filing date of corresponding U.S. Provisional Patent Application Ser. No. 61/098,370, entitled "Electromagnetic Clamping Device", filed Sep. 19, 2008, which are incorporated herein by reference.

BACKGROUND INFORMATION

1. Field

The present disclosure relates generally to manufacturing and in particular to a method and apparatus for processing a workpiece. Still more particularly, the present disclosure relates to a method and apparatus for clamping a workpiece to perform various operations on the workpiece.

2. Background

Installation of rivets and/or other types of fasteners may be performed in large airframe structures. These airframe structures include, for example, without limitation, wing and fuselage skins to supporting structures, and other suitable structures. These types of installations may be performed using manual and/or computer-controlled machines. Clamping devices may be installed by drilling holes through a workpiece and installing temporary fasteners into the holes to clamp together parts that are to be joined. Next, a hole may be drilled through the workpiece with a drill. A rivet or other type of fastener may be installed into the hole.

This type of process may be time consuming and expensive, especially when performed manually in locations where an automated machine cannot access a workpiece. For example, without limitation, in fuselage barrels and/or wing boxes, it may not be possible to install rivets with existing automated machines, because a machine is unable to simultaneously access both sides of these types of airframe structures. Most automated machines employ some version of a c-frame device, in which the workpiece to be operated on may be disposed between two opposing jaws of the c-frame. The c-frame jaws may support tools such as, for example, without limitation, drills and/or riveters.

Electromagnetic clamping techniques may also be used to perform operations such as, for example, without limitation, clamping, drilling, and/or fastener insertion. These types of techniques may use electromagnets on one side of a workpiece and a magnetic material, such as steel plates, on an opposite side of the workpiece for a clamping process. These steel plates may be relatively heavy when manipulated by a human operator. For example, without limitation, a steel plate may weigh up to around 30 pounds.

A human operator may hold the steel plate in place on one side of a workpiece, while the electromagnet may be positioned on the other side of the workpiece. The electromagnet may be activated to clamp the workpiece between the electromagnet and the steel plate. An operation may then be performed on the workpiece. Thereafter, the electromagnet may be turned off and the human operator may move the steel plate to another location on the workpiece.

The electromagnet may then be engaged to clamp the workpiece with the steel plate at that new location. Another operation may then be performed. This process may be repeated hundreds of times for a workpiece. Using steel plates may cause fatigue problems for personnel installing and/or removing these plates for clamping operation, especially in confined spaces such as a wing box.

Thus, the different currently available clamping mechanisms for processing workpieces with limited access space may be difficult to implement. Accordingly, there is a need for a method and apparatus for minimizing the issues described above.

SUMMARY

In one advantageous embodiment, an apparatus may comprise a permanent magnet unit, an end effector, and an electromagnetic clamping device. The end effector may be capable of performing workpiece operations. The electromagnetic clamping device may have an activated state and a deactivated state.

In another advantageous embodiment, an electromagnetic clamping system may be present for clamping a workpiece having a plurality of components, wherein the electromagnetic clamping system may comprise a permanent magnet unit. The permanent magnet unit may comprise a housing, a number of permanent magnets, a number of low friction surfaces comprising a number of wheels, an end effector, an electromagnetic clamping device, a first coil system, a second coil system, a third coil system, and a core. The end effector may be capable of performing workpiece operations, wherein the end effector comprises at least one of a drill and a riveter. The electromagnetic clamping device may have an activated state and a deactivated state, wherein the electromagnetic clamping device may comprise a first coil system that may be capable of generating a first magnetic field causing a number of normal force on the permanent magnet unit and the electromagnetic clamping device; a second coil system that may be capable of generating a second magnetic field causing a side force on the permanent magnet unit; and a third coil system that may be capable of generating a third magnetic field causing a rotational force on the permanent magnet unit. The core may be capable of providing access to a surface of the workpiece to perform the operations on the workpiece. The core may be capable of concentrating a force from a number of magnetic fields on a surface of the core contacting the surface of the workpiece. The electromagnetic clamping device may generate the number of magnetic fields in the activated state at a strength causing the permanent magnet unit to clamp the workpiece to the electromagnetic clamping device. The electromagnetic clamping device may change the strength of the number of magnetic fields in the deactivated state to a level causing the permanent magnet unit to become moveable along the surface of the workpiece. When the electromagnetic clamping device is in the deactivated state, the permanent magnet unit may be in a rolling mode in which the number of wheels may engage the surface of the workpiece and the number of permanent magnets may move away from the surface of the workpiece. Also, when the electromagnetic clamping device is in the deactivated state, the permanent magnet unit may generate a magnetic field such that movement of the electromagnetic clamping device may pull the permanent magnet unit. When the electromagnetic clamping device is in the activated state, the permanent magnetic unit may be in a fixed mode in which the number of wheels may be disengaged from the surface of the workpiece and the number of permanent magnets moves to engage the surface of the workpiece.

In yet another advantageous embodiment, a method may be present for performing an operation on a workpiece. A permanent magnet unit may be positioned on a first surface of the workpiece. An electromagnetic clamping device may be positioned on a second surface of the workpiece, wherein the first surface opposes the second surface. The electromagnetic clamping device may be placed in an activated state such that a magnetic field clamps the workpiece between the electromagnetic clamping device and the permanent magnet unit. An operation may be performed on the workpiece.

In still yet another advantageous embodiment, a method may be present for performing an operation on a workpiece having at least two components with an electromagnetic clamping system. A permanent magnet unit may be positioned in the electromagnetic clamping system on a first surface of the workpiece. An electromagnetic clamping device may be positioned in the electromagnetic clamping system on a second surface of the workpiece, wherein the first surface may oppose the second surface. The electromagnetic clamping device may be placed in an activated state such that a magnetic field may clamp the workpiece between the electromagnetic clamping device and the permanent magnet unit. The operation may be performed on the workpiece, wherein the operation may be selected from at least one of a drilling operation and a fastening operation. The electromagnetic clamping device may be placed in a deactivated state after performing the operation such that the electromagnetic clamping device may change a strength of the number of forces allowing the permanent magnet unit to become moveable on the first surface. The permanent magnet unit may be moved with the electromagnetic clamping device by at least one of moving the electromagnetic clamping device, wherein the electromagnetic clamping device may pull the permanent magnet unit and generating another magnetic field with a side force moving the permanent magnetic unit on the first surface.

In a further advantageous embodiment, a method may be present for assembling parts. A sealant may be placed between a plurality of parts in a stack up to form a workpiece. The workpiece may be clamped using a permanent magnet unit and an electromagnetic clamping device in an activated state such that a number of forces caused by a magnetic field may clamp the workpiece between the electromagnetic clamping device and the permanent magnet unit. A number of holes may be drilled in the work piece, and a number of fasteners may be installed in the number of holes.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
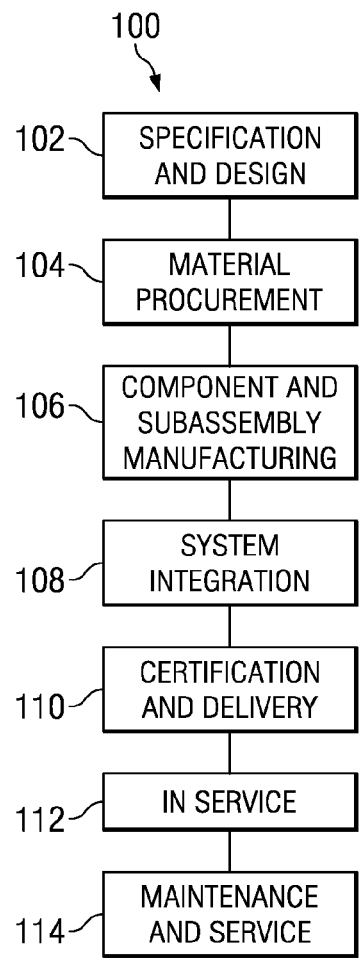
FIG. 1 is a diagram illustrating an aircraft manufacturing and service method in accordance with an advantageous embodiment.
Figure 2:
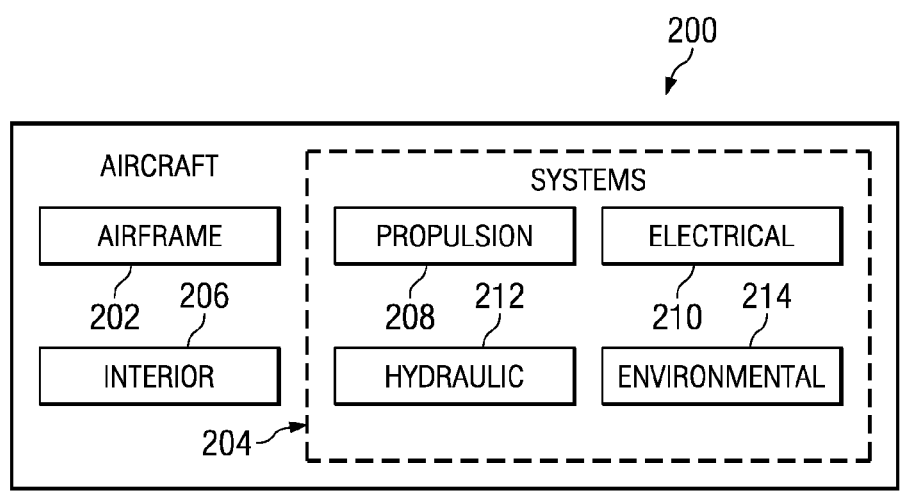
FIG. 2 is a diagram of an aircraft in which an advantageous embodiment may be implemented.

Referring more particularly to the drawings, embodiments of the disclosure may be described in the context of the aircraft manufacturing and service method 100 as shown in FIG. 1 and aircraft 200 as shown in FIG. 2. Turning first to FIG. 1, a diagram illustrating an aircraft manufacturing and service method is depicted in accordance with an advantageous embodiment. During pre-production, exemplary aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 may be scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft is depicted in which an advantageous embodiment may be implemented. In this example, aircraft 200 may be produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during any one or more of the stages of aircraft manufacturing and service method 100 in FIG. 1. For example, without limitation, components or subassemblies produced in component and subassembly manufacturing 106 in FIG. 1 may be fabricated or manufactured in a manner similar to components or subassemblies produced while aircraft 200 is in service 112 in FIG. 1.

Also, one or more apparatus embodiments, method embodiments, or a combination thereof may be utilized during production stages, such as component and subassembly manufacturing 106 and system integration 108 in FIG. 1, for example, without limitation, by substantially expediting the assembly of or reducing the cost of aircraft 200.

Similarly, one or more of apparatus embodiments, method embodiments, or a combination thereof may be utilized during maintenance and service 114 in FIG. 1. For example, without limitation, an electromagnetic clamping system in accordance with an advantageous embodiment may be used to clamp and/or secure a workpiece during component and subassembly manufacturing 106, system integration 108, and/or during maintenance in service 114.

The different advantageous embodiments recognize that currently used clamping systems may be expensive and impractical. Further, the different advantageous embodiments recognize and take into account that the use of steel plates, in currently available electromagnetic clamping systems, requires positioning during various operations on a workpiece. The different advantageous embodiments recognize and take into account that in many cases, the architecture and/or size of a workpiece may prevent the use of automated machinery such as, for example, without limitation, robotic devices to perform clamping, drilling, fastening, and/or other operations on a workpiece.

Thus, the different advantageous embodiments provide a method and apparatus for clamping a workpiece. In the different advantageous embodiments, an electromagnetic clamping system may include a permanent magnet unit, an electromagnetic clamping device, and an end effector. The electromagnetic clamping device may have an activated state and a deactivated state. During the activated state, the electromagnetic clamping device may generate a force to cause the permanent magnet unit to be pulled towards the magnetic clamping device to clamp the workpiece.

Different operations may then be performed on the workpiece with these devices in place. Thereafter, the electromagnetic clamping device may move the permanent magnet unit to the next location on the workpiece to perform another operation. The electromagnetic clamping device may provide a different and/or lower magnetic field to move the permanent magnet unit. The electromagnetic clamping device may generate a repelling force between the electromagnetic clamping device and the permanent magnet. This type of field may be generated to prevent accidental clamping of parts during movement of the electromagnetic clamping device.

Figure 3:
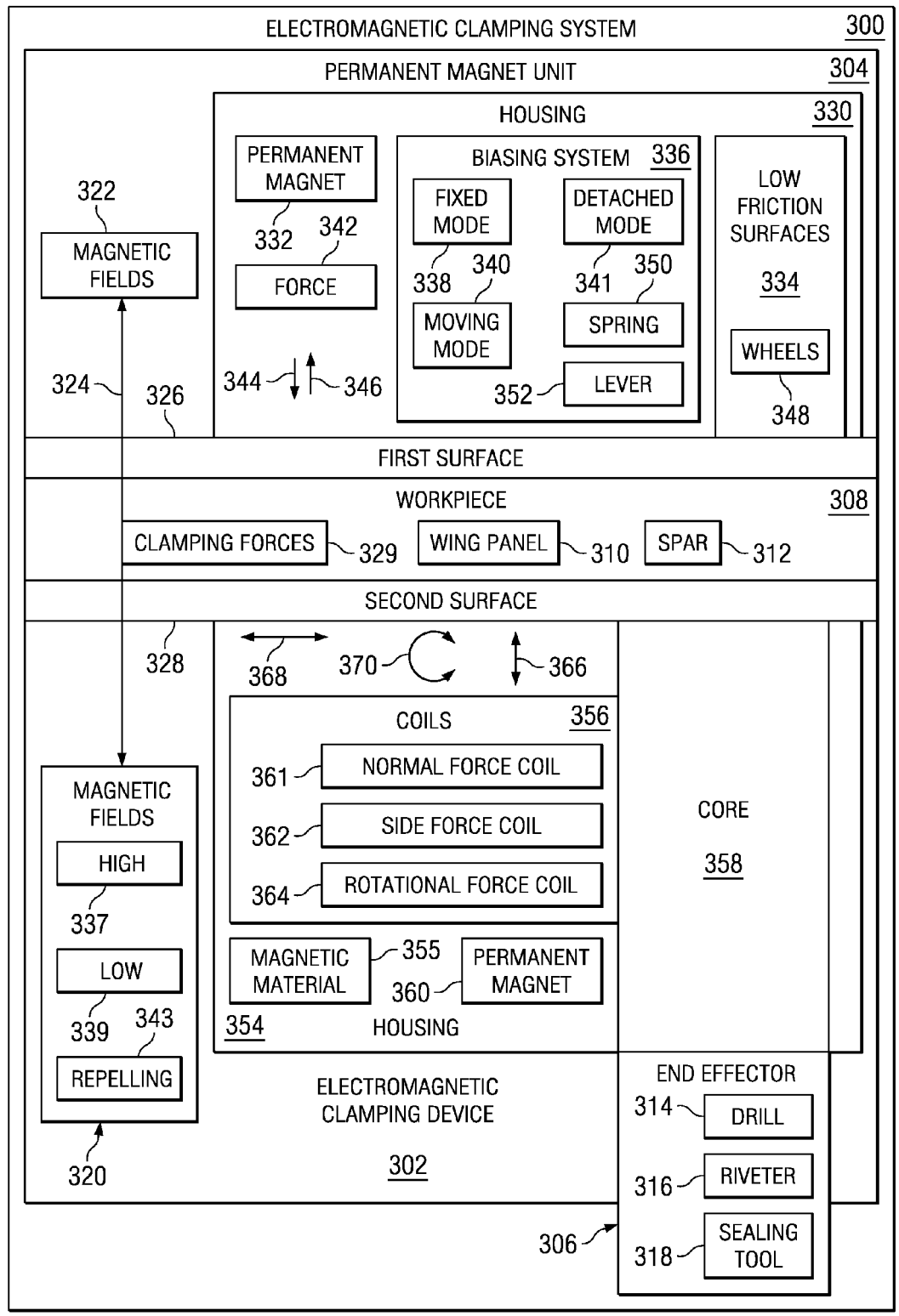
FIG. 3 is a diagram of an electromagnetic clamping system in accordance with an advantageous embodiment.

With reference now to FIG. 3, a diagram of an electromagnetic clamping system is depicted in accordance with an advantageous embodiment. In this example, electromagnetic clamping system 300 may include electromagnetic clamping device 302, permanent magnet unit 304, and end effector 306.

Permanent magnet unit 304 and electromagnetic clamping device 302 may provide clamping forces to clamp workpiece 308. Workpiece 308 may be a structure on which an operation may be performed. Workpiece 308 may include multiple components that may be clamped together by permanent magnet unit 304 and electromagnetic clamping device 302. For example, without limitation, workpiece 308 may include wing panel 310, spar 312, and other suitable components.

End effector 306 may be a device that may be capable of performing operations on workpiece 308. These operations may include, for example, without limitation, drilling operations, fastening operations, sealing operations, and other suitable operations. In these examples, end effector 306 may be any tool needed to perform operations on workpiece 308. For example, without limitation, end effector 306 may be drill 314, riveter 316, sealing tool 318, and/or some other suitable device.

In operation, electromagnetic clamping device 302 may generate magnetic fields 320, which interacts with magnetic fields 322 in permanent magnet unit 304 as shown by arrow 324. This interaction may cause permanent magnet unit 304 to be pulled towards first surface 326 and electromagnetic clamping device 302 to be pulled towards second surface 328 of workpiece 308 with clamping forces 329. The level of force may vary, depending on magnetic fields 320 as generated by electromagnetic clamping device 302.

In this example, permanent magnet unit 304 may have housing 330, which may contain permanent magnets 332, low friction surfaces 334, and biasing system 336. Housing 330 may be made from different materials. For example, without limitation, any non-ferrous material may be used such as, aluminum, plastic composites, and/or other suitable materials. Biasing system 336 may place permanent magnet unit 304 in a number of different modes. For example, without limitation, biasing system 336 may place permanent magnet unit 304 in fixed mode 338, moving mode 340, detached mode 341, and/or any other suitable mode.

In the different advantageous embodiments, the different modes for biasing system 336 may be controlled by electromagnetic clamping device 302 through magnetic fields 320. For example, without limitation, when magnetic fields 320 are high 337, biasing system 336 may be in fixed mode 338. When magnetic fields 320 are low 339, biasing system 336 may be in moving mode 340. Electromagnetic clamping device 302 may generate a lower amount of force and/or no force in a manner that allows permanent magnet unit 304 to continue to be held by electromagnetic clamping device 302 against workpiece 308, but with less force.

In this state, electromagnetic clamping device 302 may move permanent magnet unit 304. In these examples, high 337 may be when clamping forces 329 are sufficient to clamp permanent magnet unit 304 and electromagnetic clamping device 302 to workpiece 308 in a manner in which various operations may be performed on workpiece 308. Low 339 may be when clamping forces 329 may be present at a lower level than high 337, such that electromagnetic clamping device 302 may move permanent magnet unit 304 along first surface 326 of workpiece 308. When magnetic fields 320 are repelling 343, biasing system 336 may be in detached mode 341.

When in fixed mode 338, permanent magnets 332 and/or housing 330 may engage first surface 326 to provide force 342 in the direction of arrow 344. This force may be provided through the interaction of magnetic fields 322 with magnetic fields 320. In this mode, low friction surfaces 334 may or may not engage first surface 326.

When biasing system 336 is in moving mode 340, permanent magnet 332 may be moved away from first surface 326 in the direction of arrow 346. In this mode, biasing system 336 may move low friction surfaces 334 in the direction of arrow 344 to engage first surface 326. Low friction surfaces 334 have a coefficient of friction that may allow permanent magnet unit 304 to be moved along first surface 326 of workpiece 308. In moving mode 340, permanent magnet unit 304 may be moved along first surface 326 by electromagnetic clamping device 302.

In this mode, magnetic fields 320 are low 339, which have a strength that is sufficient to interact with magnetic fields 322 to cause permanent magnet unit 304 to move, while biasing system 336 is in moving mode 340. This movement may be caused by movement of electromagnetic clamping device 302 and/or through magnetic fields 320. In detached mode 341, permanent magnet unit 304 may be detached from first surface 326.

In these examples, low friction surfaces 334 may take the form of wheels 348. Wheels 348 may be, for example, without limitation, caster wheels. Of course, in other advantageous embodiments, other types of low friction surfaces may be used. Low friction surfaces that may be used include, for example, without limitation, materials made of fluoropolymers, and/or other suitable low friction materials. One specific example may be Teflon® pads. Teflon is a registered trademark of the DuPont Company.

Biasing system 336 may move permanent magnet 332 and/or low friction surfaces 334 as different modes are entered using various mechanisms. For example, without limitation, spring 350 may bias permanent magnet 332 in the direction of arrow 346, and lever 352 may bias low friction surfaces 334 in the different directions as shown by arrows 346 and 344.

In the different advantageous embodiments, electromagnetic clamping device 302 may include housing 354, which may contain coils 356 and core 358. Housing 354 may be made of various materials. For example, without limitation, housing 354 may be comprised of magnetic material 355. A magnetic material in these examples is a material that may be magnetized when magnetic fields 320 are generated. Magnetic material 355 may not include permanent magnet 360 in these examples. In some advantageous embodiments, housing 354 may be made from a combination of magnetic material 355 and permanent magnet 360. Coils 356 may include, for example, without limitation, normal force coil 361, side force coil 362, and rotational force coil 364.

Normal force coil 361 may generate a number of magnetic fields within magnetic fields 320 to generate a substantially normal force to second surface 328 along the direction of arrow 366. A number of items, as used herein, refers to one or more items. For example, without limitation, a number of magnetic fields is one or more magnetic fields. Side force coil 362 may generate a number of magnetic fields within magnetic fields 320 to generate side forces in the direction as indicated by arrow 368. Rotational force coil 364 may generate a number of magnetic fields within magnetic fields 320 to create rotational forces as indicated by arrow 370.

Normal force coil 361 may generate a magnetic field in magnetic fields 320 used to create clamping forces 329 to clamp permanent magnetic unit 304 and electromagnetic clamping device 302 to workpiece 308. Side force coil 362 and/or rotational force coil 364 may generate a number of magnetic fields within magnetic fields 320 to pull or move permanent magnet unit 304 along first surface 326 in the direction of arrow 368 and/or arrow 370.

Movement of permanent magnet unit 304 may be performed by at least one of generating forces with magnetic fields 320 and moving electromagnetic clamping device 302. As used herein, the phrase "at least one of", when used with a list of items, means that different combinations of one or more of the items may be used and only one of each item in the list may be needed. For example, without limitation, "at least one of item A, item B, and item C" may include, for example, without limitation, item A, or item A and item B. This example also may include item A, item B, and item C, or item B and item C.

The movement of permanent magnet unit 304 may not require movement of electromagnetic clamping device 302. Permanent magnet unit 304 may also be moved by moving electromagnetic clamping device 302 along the direction of arrow 368 to pull permanent magnet unit 304 along the direction of arrow 368.

Core 358 may provide a channel through housing 354 through which end effector 306 may perform various operations on workpiece 308. In some examples, permanent magnet 360 may be used in conjunction with coils 356 to provide clamping forces 329.

Illustration of electromagnetic clamping system 300 in FIG. 3 is not meant to imply physical or architectural limitations to the manner in which different advantageous embodiments may be implemented. Other functions and/or features may be used in addition to or in place of the ones illustrated in FIG. 3. For example, in some advantageous embodiments, a positioning feature may be present to identify the position of permanent magnet unit 304 with respect to electromagnetic clamping device 302.

In yet other advantageous embodiments, two permanent magnet units may be employed rather than just permanent magnet unit 304. Further, in some advantageous embodiments, one or more additional permanent magnets may be used within or outside of housing 330 in addition to permanent magnet 332. In yet another advantageous embodiment, electromagnetic clamping device 302 may have only a single coil instead of multiple coils. For example, without limitation, electromagnetic clamping device 302 may only contain normal force coil 361.

Figure 4:
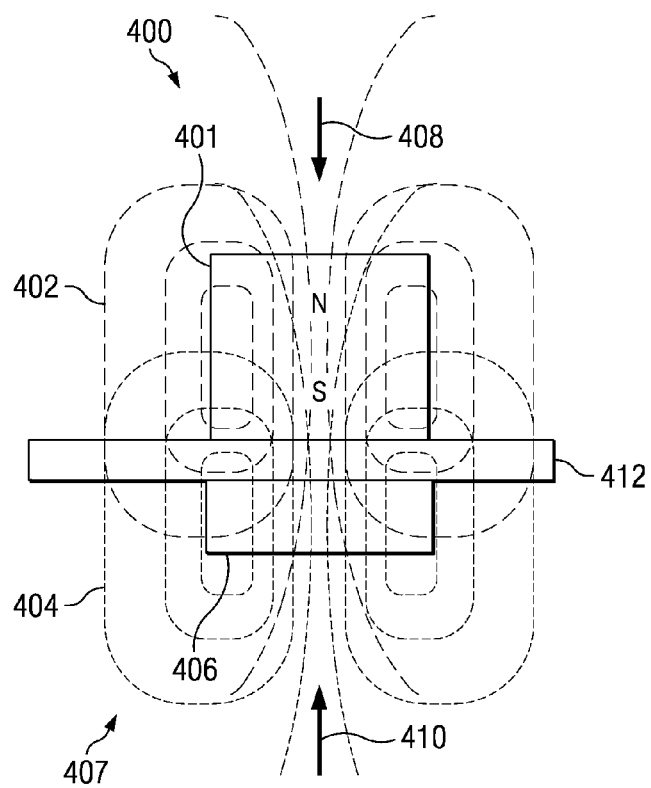
FIG. 4 is a diagram illustrating the use of an electromagnetic clamping device and a permanent magnet unit to provide clamping force in accordance with an advantageous embodiment.

With reference now to FIG. 4, a diagram illustrating the use of an electromagnetic clamping device and a permanent magnet unit to provide clamping force is depicted in accordance with an advantageous embodiment. Electromagnetic clamping system 400 is an example of one implementation for electromagnetic clamping system 300 in FIG. 3.

In this example, electromagnetic clamping device 401 in electromagnetic clamping system 400 may generate magnetic field 402 that may interact with magnetic field 404 as generated by permanent magnet unit 406, which also may be part of electromagnetic clamping system 400. In this example, electromagnetic clamping device 401 may generate a positive polarity, such that magnetic field 404 is at high level 407 to generate clamping forces 408 and 410.

This interaction between magnetic field 402 and magnetic field 404 may create clamping forces 408 and 410, which pull electromagnetic clamping device 401 and permanent magnet unit 406 towards each other to clamp workpiece 412. The amount of clamping force created for clamping forces 408 and 410 may vary depending on the strength of magnetic field 402 as generated by electromagnetic clamping device 401.

Figure 5:
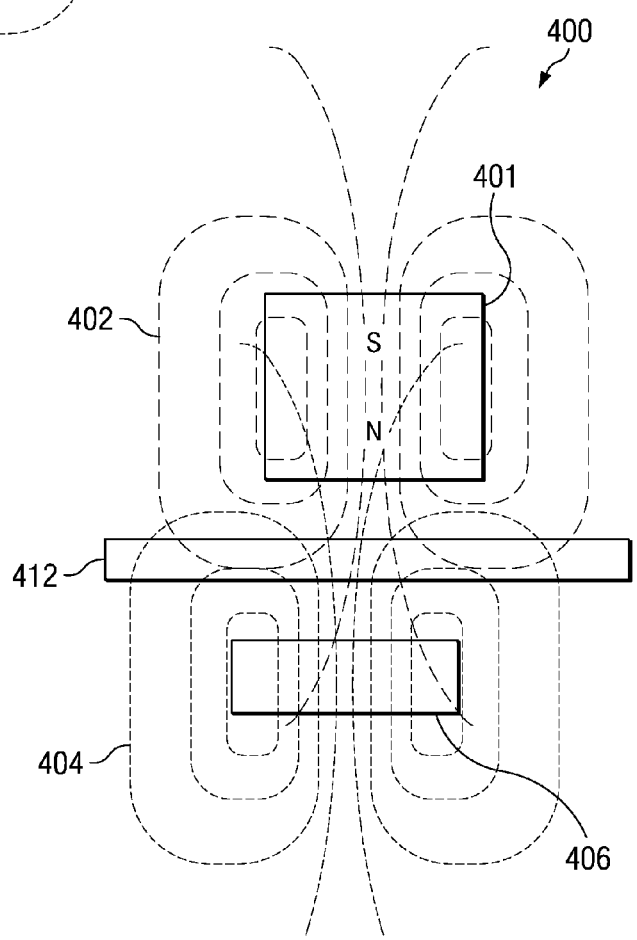
FIG. 5 is a diagram illustrating a change in clamping force between an electromagnetic clamping device and a permanent magnet unit in accordance with an advantageous embodiment.

With reference now to FIG. 5, a diagram illustrating a change in clamping force between an electromagnetic clamping device and a permanent magnet unit is depicted in accordance with an advantageous embodiment. In this example, electromagnetic clamping device 401 may have changed the polarity in magnetic field 402. The interaction between magnetic field 402 and magnetic field 404 may cause electromagnetic clamping device 401 and permanent magnet unit 406 to repel from each other away from workpiece 412. This type of interaction may be useful when disengaging electromagnetic clamping device 401 and permanent magnet unit 406 from workpiece 412.

Figure 6:
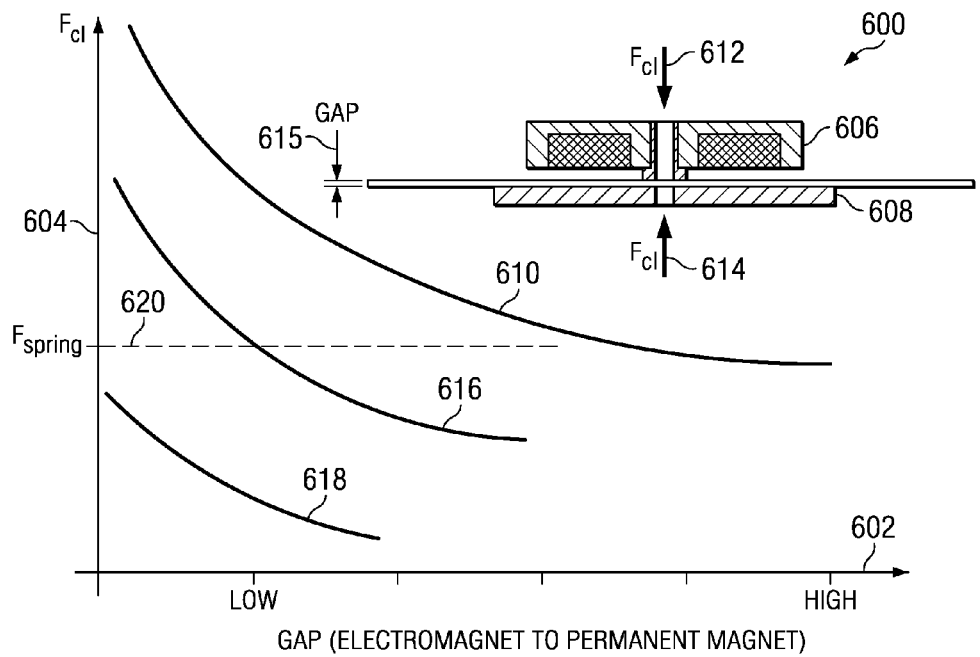
FIG. 6 is a diagram illustrating electromagnetic forces that may be generated between an electromagnetic clamping device and a permanent magnet unit in accordance with an advantageous embodiment.

With reference now to FIG. 6, a diagram illustrating electromagnetic forces that may be generated between an electromagnetic clamping device and a permanent magnet unit is depicted in accordance with an advantageous embodiment. In this diagram, graph 600 x-axis 602 represents a gap, and y-axis 604 represents the clamping force. The gap, in these examples, may be a distance between electromagnetic clamping device 606 and permanent magnet unit 608. This gap may vary depending on the size and/or thickness of the workpiece.

Line 610 illustrates clamping forces 612 and 614 generated by electromagnetic clamping device 606 in an active and/or normal polarity based on gap 615. Line 616 shows the clamping force generated between electromagnetic clamping device 606 and permanent magnet unit 608 when electromagnetic clamping device 606 is deactivated. In line 616, electromagnetic clamping device 606 may cause clamping forces 612 and 614 to have a lower level, allowing movement of permanent magnet unit 608 by electromagnetic clamping device 606.

Line 618 may illustrate clamping forces 612 and 614 generated by electromagnetic clamping device 606 and permanent magnet unit 608 when electromagnetic clamping device 606 has reversed polarity. Line 620 may illustrate an amount of biasing or spring force that may be applied to a permanent magnet, in permanent magnet unit 608, to pull permanent magnet unit 608 away from electromagnetic clamping device 606.

Figure 7:
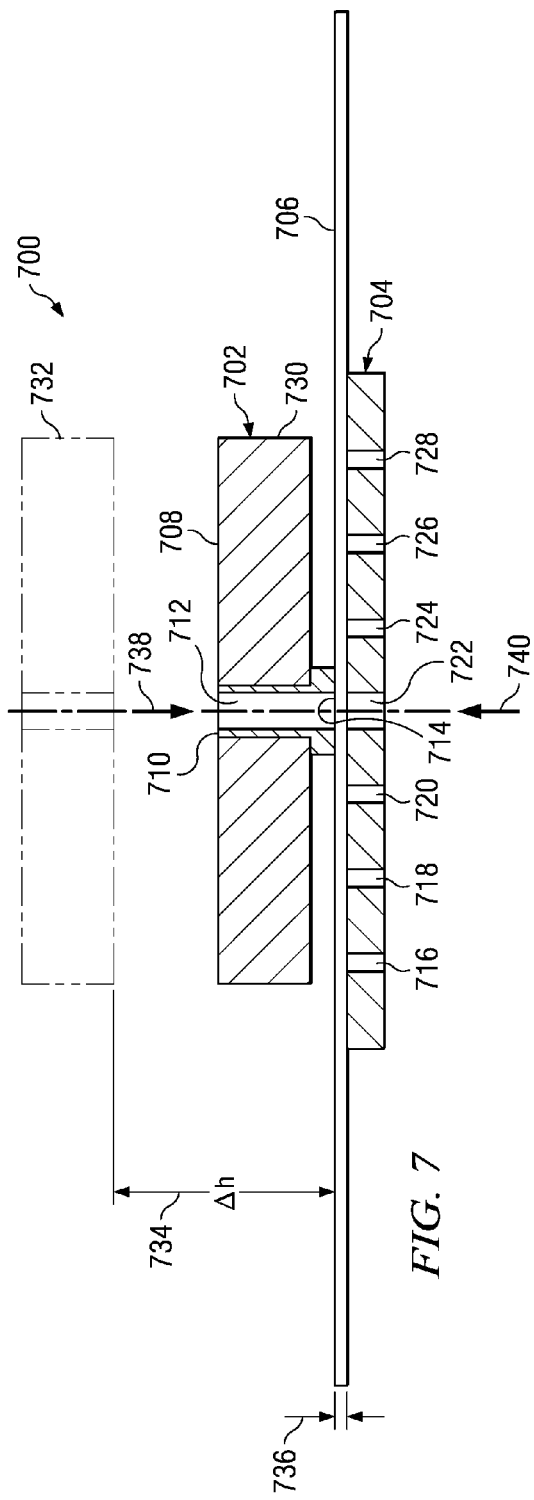
FIG. 7 is a diagram illustrating an electromagnetic clamping system in accordance with an advantageous embodiment.

With reference now to FIG. 7, a diagram illustrating a permanent magnet clamping system is depicted in accordance with an advantageous embodiment. Permanent magnet clamping system 700 may include permanent magnet clamping device 702 and permanent magnet unit 704, which may be used to clamp workpiece 706 to perform various operations.

In this example, permanent magnet clamping device 702 may comprise permanent magnet 708 and core 710. Core 710 may include channel 712, which may allow for drilling operations to be performed on surface 714 of workpiece 706.

Permanent magnet unit 704 may include channels 716, 718, 720, 722, 724, 726, and 728. One or more of these channels may be aligned with channel 712 for use in drilling operations to be performed on workpiece 706. In this example, permanent magnet clamping device 702 may be in an active state when in position 730. In position 732, permanent magnet unit 704 may provide less clamping force with an increase of distance 734, Δh, from permanent magnet unit 704.

In this example, gap 736, t, may be present between electromagnetic clamping device 702 in position 730 and permanent magnet unit 704. Clamping forces 738 and 740 exerted by permanent magnet clamping device 702 and permanent magnet unit 704 may be calculated as follows: $F_{c1}=f(t)$, f(t) is a function based on t. In these examples, gap 736, t, may be around zero inches to around one inch. The value of distance 734, Δh, may indicate the level of clamping force. A value of zero for distance 734, Δh, may indicate a clamping condition in which a clamping force may be generated. A value greater than zero for distance 734, Δh, may indicate an unclamped condition in which a reduced or absent clamping force may be provided.

Figure 8:
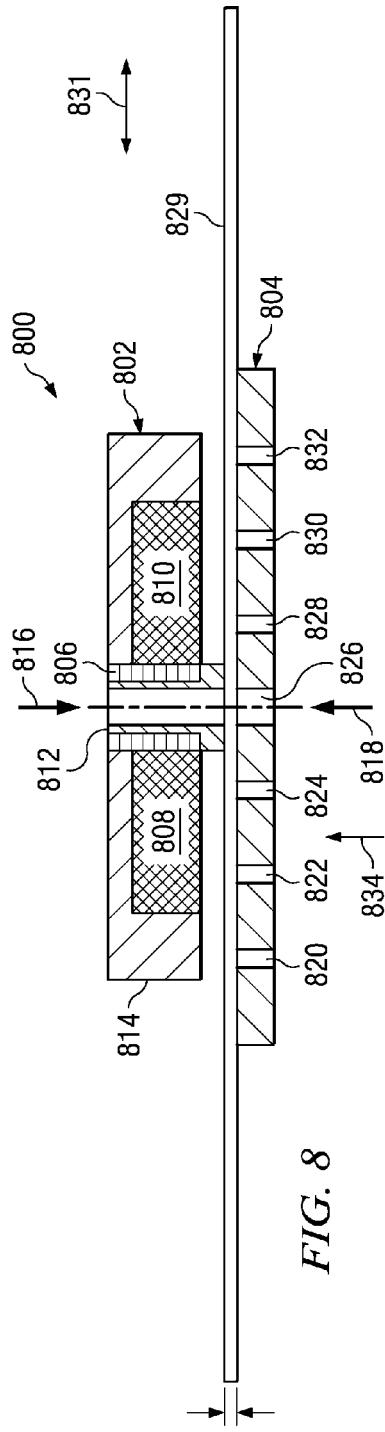
FIG. 8 is a diagram illustrating an electromagnetic clamping system in accordance with an advantageous embodiment.

With reference now to FIG. 8, a diagram illustrating an electromagnetic clamping system is depicted in accordance with an advantageous embodiment. Electromagnetic clamping system 800 is an example of an implementation for electromagnetic clamping system 300 in FIG. 3. In this example, electromagnetic clamping system 800 may include electromagnetic clamping device 802 and permanent magnet unit 804.

In this example, electromagnetic clamping device 802 may include coils 806, permanent magnet 808, permanent magnet 810, core 812, and housing 814. Coils 806 may be integrated into housing 814 to generate magnetic fields (not shown) along with magnetic fields (not shown) that may be generated by permanent magnets 808 and 810. Housing 814 may be comprised of a magnetic material such as, for example, without limitation, steel, which may be used to increase clamping forces 816 and 818.

Permanent magnet unit 804 may include channels 820, 822, 824, 826, 828, 830, and 832. In this example, electromagnetic clamping device 802 and permanent magnet unit 804 may provide forces to clamp workpiece 829. Electromagnetic clamping system 800 is an example of one implementation of electromagnetic clamping system 300 in FIG. 3.

In this example, when electromagnetic clamping device 802 is activated, electromagnetic clamping device 802 may pull permanent magnet unit 804 in the direction of arrow 834 in a manner to clamp workpiece 829. When electromagnetic clamping device 802 is deactivated, permanent magnets 808 and 810 may still pull permanent magnet unit 804 towards electromagnetic clamping device 802. Further, in the deactivated state, electromagnetic clamping device 802 may still generate clamping forces 816 and 818 at a lower strength.

Clamping forces 816 and 818 may have less force that may allow for movement of electromagnetic clamping device 802 to also pull permanent magnet unit 804 in the direction of arrow 831 when electromagnetic clamping device 802 is moved in the direction of arrow 831. When electromagnetic clamping device 802 is reversed in polarity, the change in force may be such that permanent magnet unit 804 may be removed or detached.

Figure 9:
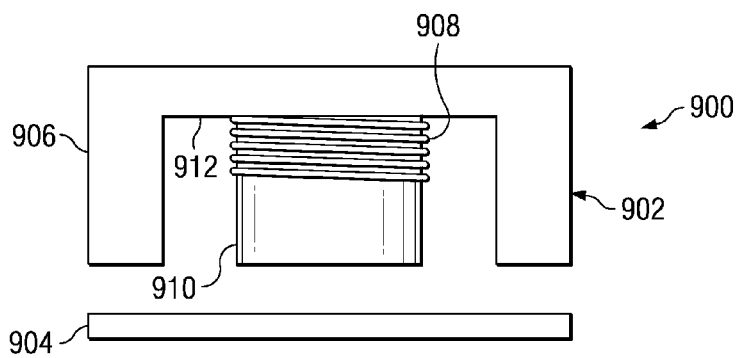
FIG. 9 is a diagram illustrating an electromagnetic clamping system in accordance with an advantageous embodiment.

With reference now to FIG. 9, a diagram illustrating an electromagnetic clamping system is depicted in accordance with an advantageous embodiment. Electromagnetic clamping system 900 is an illustration of one implementation of electromagnetic clamping system 300 in FIG. 3.

In this example, electromagnetic clamping system 900 may include electromagnetic clamping device 902 and permanent magnet unit 904. In this example, electromagnetic clamping device 902 may include housing 906, coil 908, and permanent magnet 910. In this example, coil 908 may be attached to interior surface 912 of housing 906. Permanent magnet 910 may be connected to coil 908. Housing 906, in these examples, may be made of a magnetic material such as, for example, without limitation, steel and/or iron.

Figure 10:
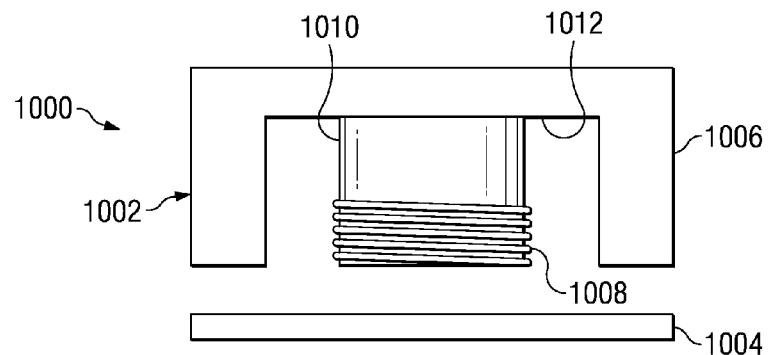
FIG. 10 is a diagram illustrating an electromagnetic clamping system in accordance with an advantageous embodiment.

With reference now to FIG. 10, a diagram illustrating an electromagnetic clamping system is depicted in accordance with an advantageous embodiment. In this example, electromagnetic clamping system 1000 is an example of one implementation for electromagnetic clamping system 300 in FIG. 3.

Electromagnetic clamping system 1000 may include electromagnetic clamping device 1002 and permanent magnet unit 1004. Electromagnetic clamping device 1002 may include housing 1006, coil 1008, and permanent magnet 1010. In this example, permanent magnet 1010 may be attached to interior surface 1012 of housing 1006. Coil 1008 is attached to permanent magnet 1010.

Figure 11:
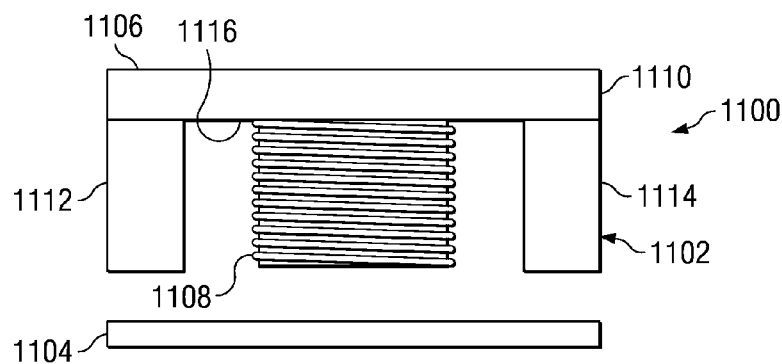
FIG. 11 is a diagram illustrating an electromagnetic clamping system in accordance with an advantageous embodiment.

With reference now to FIG. 11, a diagram illustrating an electromagnetic clamping system is depicted in accordance with an advantageous embodiment. In this example, electromagnetic clamping system 1100 is an example of yet another implementation for electromagnetic clamping system 300 in FIG. 3.

Electromagnetic clamping system 1100 may include electromagnetic clamping device 1102 and permanent magnet unit 1104. Electromagnetic clamping device 1102 may include housing 1106 and coil 1108. In this example, permanent magnet 1110 may be incorporated as part of housing 1106. Section 1112 and section 1114 of housing 1106 may be made of a magnetic material such as, for example, without limitation, steel, iron, or some other suitable material. Coil 1108 may be attached to interior surface 1116 of permanent magnet 1110 in this example.

Figure 12:
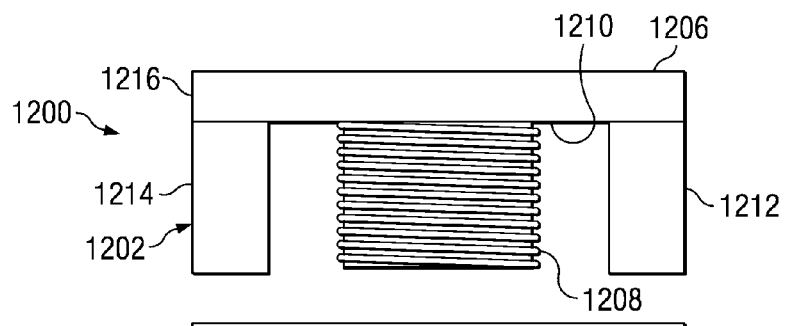
FIG. 12 is a diagram illustrating an electromagnetic clamping system in accordance with an advantageous embodiment.

With reference now to FIG. 12, a diagram illustrating an electromagnetic clamping system is depicted in accordance with an advantageous embodiment. Electromagnetic clamping system 1200 is an example of an implementation of electromagnetic clamping system 300 in FIG. 3.

Electromagnetic clamping system 1200 may include electromagnetic clamping device 1202 and permanent magnet unit 1204. In this illustrative example, electromagnetic clamping device 1202 may include housing 1206 and coil 1208. Coil 1208 is attached to inner surface 1210 of housing 1206. Housing 1206 may include magnetic material section 1212, permanent magnet section 1214, and permanent magnet section 1216. As can be seen in this example, both permanent magnet and non-permanent magnet sections may be integrated into housing 1206.

Figure 13:
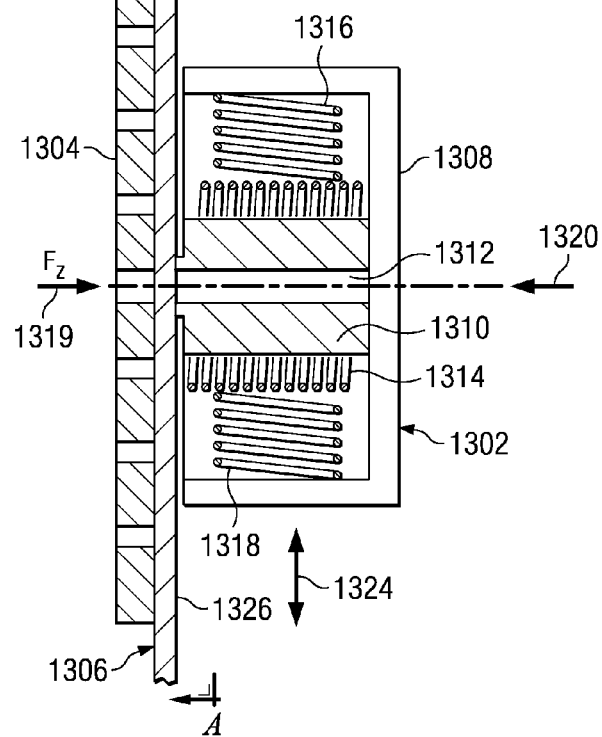
FIG. 13 is a diagram illustrating an electromagnetic clamping system in accordance with an advantageous embodiment.

With reference now to FIG. 13, a diagram illustrating an electromagnetic clamping system is depicted in accordance with an advantageous embodiment. In this example, a side cross-sectional view of electromagnetic clamping system 1300 is illustrated. Electromagnetic clamping system 1300 is an example of one implementation of electromagnetic clamping system 300 in FIG. 3.

In this illustrative example, electromagnetic clamping system 1300 may include electromagnetic clamping device 1302 and permanent magnet unit 1304. These two components may clamp workpiece 1306 to allow for different operations to be performed on workpiece 1306.

Electromagnetic clamping device 1302 includes housing 1308, core 1310 having channel 1312, normal force coil 1314, side force coil 1316, and side force coil 1318. In this example, normal force coil 1314 may generate clamping forces 1319 and 1320, which may be approximately normal to surface 1322 of workpiece 1306. Side force coil 1316 and side force coil 1318 may generate a force that may be along the direction of arrow 1324, which may be approximately parallel to surface 1322 of workpiece 1306.

Normal force coil 1314 may generate clamping forces 1319 and 1320 to clamp permanent magnet unit 1304 and electromagnetic clamping device 1302 to workpiece 1306. Side force coil 1316 and side force coil 1318 may generate magnetic forces that may cause permanent magnet unit 1304 to move along surface 1326 of workpiece 1306 in the direction of arrow 1324.

As a result, when normal force coil 1314 is deactivated, side force coils 1316 and 1318 may generate fields to move permanent magnet unit 304 along the direction of arrow 1324. These fields also may be referred to as Lorenze forces. In the deactivated state of the normal force coil 1314, permanent magnet 1304 may still generate forces 1319 and 1320 at a lower level.

Figure 14:
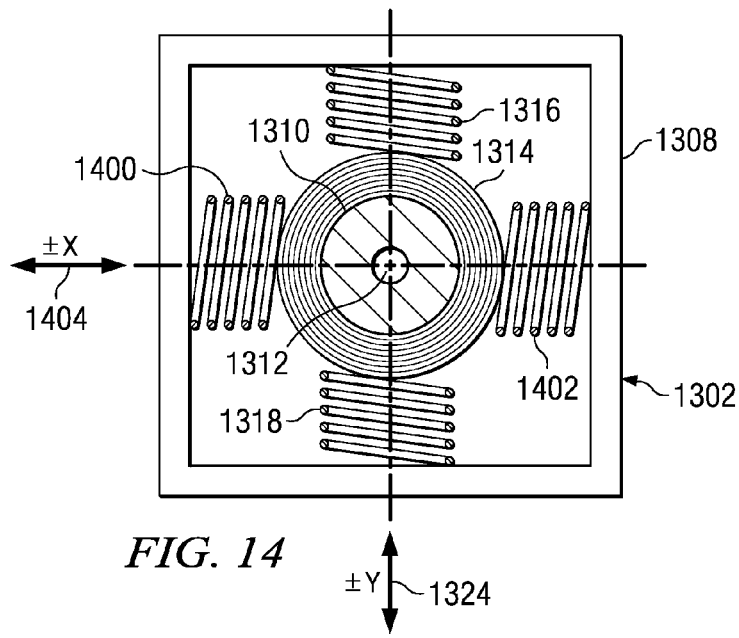
FIG. 14 is a diagram of a top cross-sectional view of an electromagnetic clamping system in accordance with an advantageous embodiment.

With reference now to FIG. 14, a diagram of a top cross-sectional view of an electromagnetic clamping system is depicted in accordance with an advantageous embodiment. This view is taken along lines 14-14 in FIG. 13. In this view, side force coil 1400 and side force coil 1402 are visible. Side force coil 1400 and side force coil 1402 may generate a magnetic field to move permanent magnet unit 1304 in the direction of arrow 1404.

Figure 15:
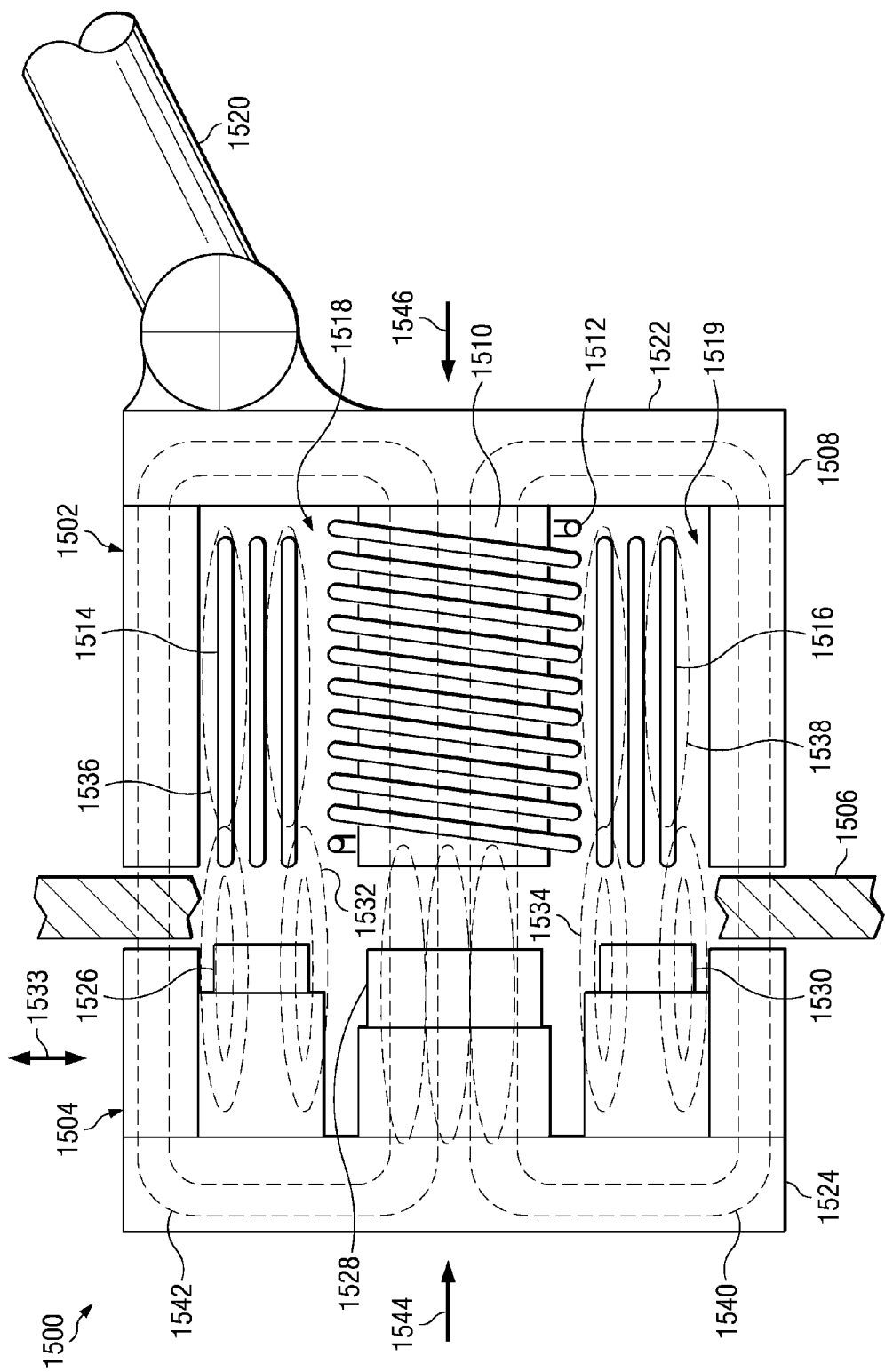
FIG. 15 is a diagram of a side cross-sectional view of an electromagnetic clamping system in accordance with an advantageous embodiment.

With reference now to FIG. 15, a diagram of a side cross-sectional view of an electromagnetic clamping system is depicted in accordance with an advantageous embodiment. In this example, electromagnetic clamping system 1500 is another example of an implementation for electromagnetic clamping system 300 in FIG. 3.

Electromagnetic clamping system 1500 may include electromagnetic clamping device 1502 and permanent magnet unit 1504. Electromagnetic clamping device 1502 and permanent magnet unit 1504 may be used to clamp workpiece 1506 for performing various operations.

In this example, electromagnetic clamping device 1502 may have housing 1508 with core 1510. Normal force coil 1512, side force coil 1514 may be located in interior 1518 of housing 1508, and side force coil 1516 may be located in interior 1519 of housing 1508. Handling device 1520 may be attached to surface 1522 of housing 1508. Handling device 1520 may be a handle, a robotic arm, or some other suitable device for manipulating and/or moving housing 1508.

Permanent magnet unit 1504 may include housing 1524, permanent magnet 1526, permanent magnet 1528, and permanent magnet 1530. In this configuration, permanent magnet 1526 and permanent magnet 1530 may generate magnetic fields 1532, and 1534 that may interact with magnetic fields 1536 and 1538 generated by side force coil 1514 and side force coil 1516 to move permanent magnet unit 1504 along the direction of arrow 1533.

Permanent magnet 1528 may generate magnetic fields 1540 that may interact with magnetic fields 1542 generated by normal force coil 1512 to generate clamping forces 1544 and 1546 to clamp permanent magnet unit 1504 and electromagnetic clamping device 1502 to workpiece 1506.

Figure 16:
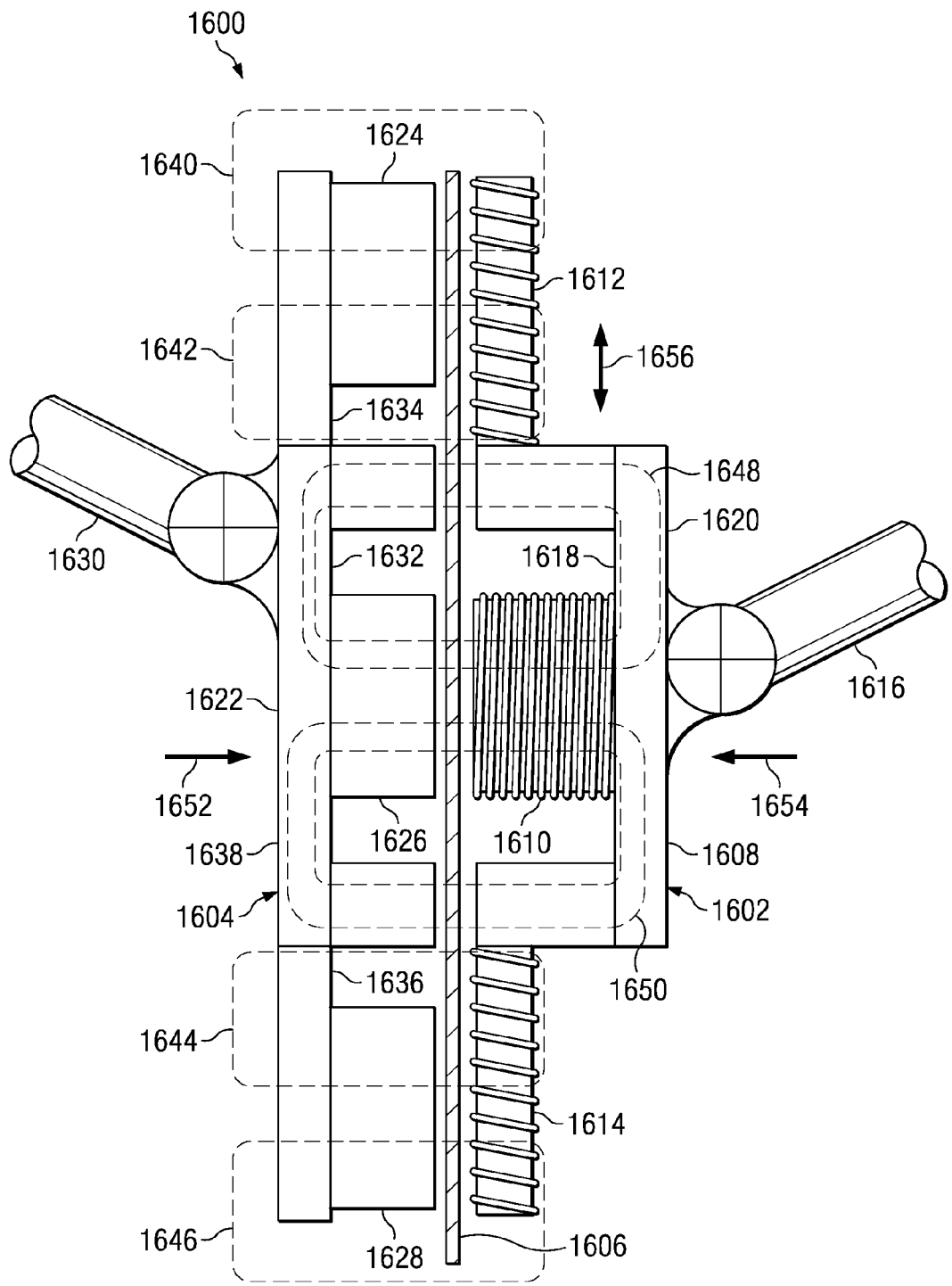
FIG. 16 is a diagram illustrating an electromagnetic clamping system in accordance with an advantageous embodiment.

With reference now to FIG. 16, a diagram illustrating an electromagnetic clamping system is depicted in accordance with an advantageous embodiment. Electromagnetic clamping system 1600 is another example implementation for electromagnetic clamping system 300 in FIG. 3.

Electromagnetic clamping system 1600 may include electromagnetic clamping device 1602 and permanent magnet unit 1604. These two components may be used to clamp workpiece 1606 for performing various operations.

Electromagnetic clamping device 1602 may include housing 1608, normal force coil 1610, side force coil 1612, side force coil 1614, and handling device 1616. In this example, normal force coil 1610 may be located on interior surface 1618 of housing 1608. Side force coil 1612, side force coil 1614, and handling device 1616 may be attached to exterior surface 1620 of housing 1608.

Permanent magnet unit 1604 may include housing 1622, permanent magnet 1624, permanent magnet 1626, permanent magnet 1628, and handling device 1630. In this example, permanent magnet 1626 may be attached to interior surface 1632 of housing 1622. Permanent magnet 1624 and permanent magnet 1628 may be attached to surfaces 1634 and 1636 of housing 1622. Handling device 1630 may be attached to exterior surface 1638 of housing 1622.

Magnetic field 1640 and magnetic field 1642 may be generated between permanent magnet 1624 and side force coil 1612 and to cause movement of permanent magnet unit 1604 along the direction of arrow 1656. Magnetic field 1644 and magnetic field 1646 may be generated between permanent magnet 1628 and side force coil 1614 to move permanent magnet unit 1604 along the direction of arrow 1656. Movement of permanent magnets 1624 and 1628 may be driven by Lorentz forces. Magnetic field 1648 and 1650 may be generated between permanent magnet 1626 and normal force coil 1610 to generate clamping forces 1652 and 1654 to clamp permanent magnet unit 1604 and electromagnetic clamping device 1602 to workpiece 1606.

In these examples, handling device 1616 and handling device 1630 may be attachments to a robotic device that may move and/or handle electromagnetic clamping device 1602 and permanent magnet unit 1604.

Figure 17:
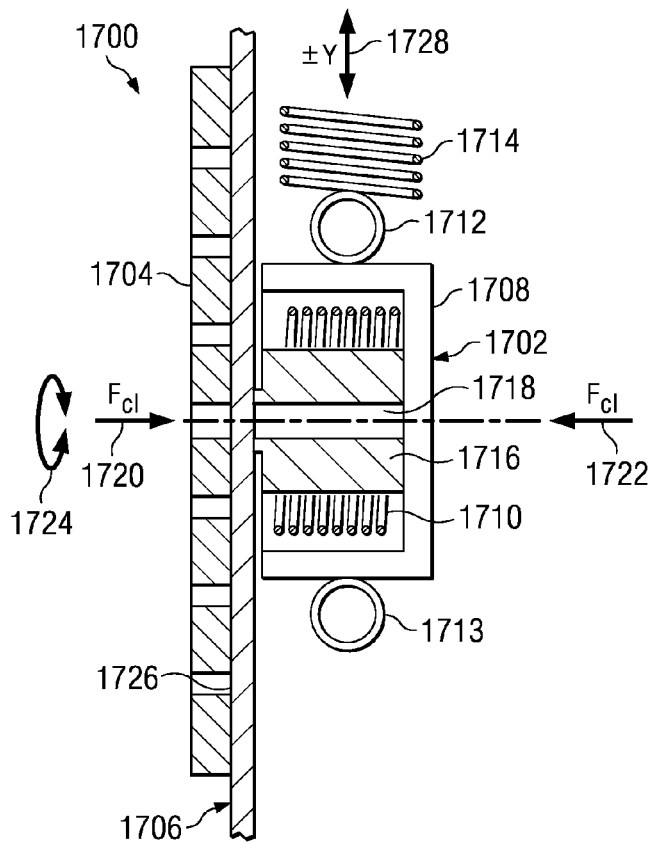
FIG. 17 is a diagram illustrating a cross-sectional side view of an electromagnetic clamping system in accordance with an advantageous embodiment.

With reference now to FIG. 17, a diagram illustrating a cross-sectional side view of an electromagnetic clamping system is depicted in accordance with an advantageous embodiment. Electromagnetic clamping system 1700 is an illustration of one implementation for electromagnetic clamping system 300 in FIG. 3.

Electromagnetic clamping system 1700 may include electromagnetic clamping device 1702 and permanent magnet unit 1704. These two components may provide a clamping force to workpiece 1706. Electromagnetic clamping device 1702 may include housing 1708, normal force coil 1710, rotational force coil 1712, rotational force coil 1713, side force coil 1714, and core 1716. Core 1716 may include channel 1718.

In the illustrative example, normal force coil 1710 may generate a magnetic field capable of causing electromagnetic clamping device 1702 and permanent magnet unit 1704 to move in the direction of arrows 1720 and 1722 to provide a clamping force on workpiece 1706. Rotational force coils 1712 and 1713 may generate a magnetic field capable of moving permanent magnet unit 1704 in the direction of arrow 1724 on surface 1726 of workpiece 1706. Side force coil 1714 may generate a magnetic field capable of moving permanent magnet unit 1704 along surface 1726 in the direction of arrow 1728.

Rotational force coils 1712 and 1713 generate a magnetic field that may interact with the magnetic field of permanent magnet unit 1704 to cause the movement of permanent magnet unit 1704 in the direction of arrow 1724. Side force coil 1714 generates the magnetic field which interacts with the magnetic field generated by permanent magnet unit 1704 to move permanent magnet unit 1704 in the direction of arrow 1728. Rotational force coils 1712 and 1713 may generate the magnetic field in a manner that interacts with the magnetic field generated by permanent magnet unit 1704 to move permanent magnet unit 1704 in the direction of arrow 1724.

Figure 18:
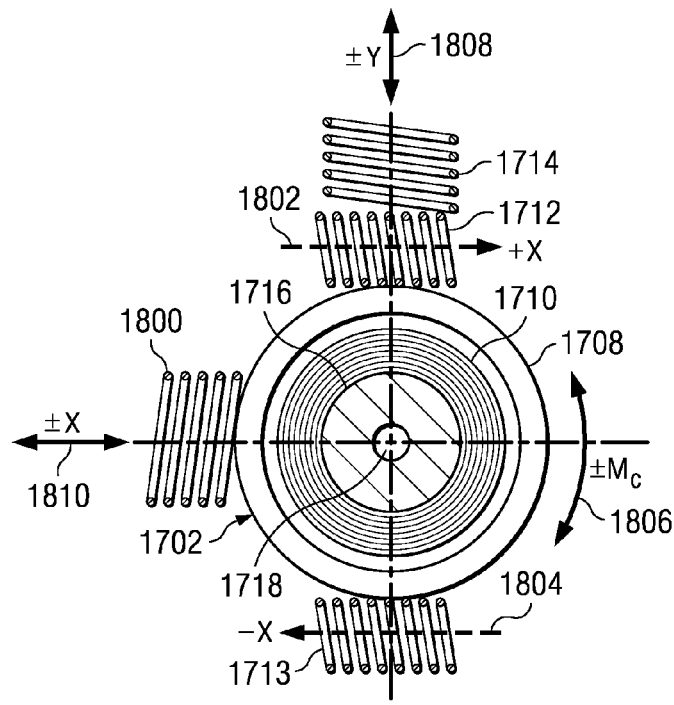
FIG. 18 is a diagram of a cross-sectional top view of an electromagnetic clamping system in accordance with an advantageous embodiment.

With reference now to FIG. 18, a diagram of a cross-sectional top view of an electromagnetic clamping system is depicted in accordance with an advantageous embodiment. In this example, side force coil 1800 also may be seen. Rotational force coil 1712 may generate a force along the direction of arrow 1802, while rotational force coil 1713 may generate force in response to a reaction of magnetic forces generated by rotational force coil 1712, rotational force coil 1713, and permanent magnet unit 1704 (not shown), along the direction of arrow 1804 to generate rotational movement as illustrated by arrow 1806.

Side force coil 1714 may generate a force in response to an interaction between the magnetic force generated by side force coil 1714 and permanent magnet unit 1704 to move permanent magnet unit 1704, in the direction of arrow 1808, while side force coil 1800 may produce force from the interaction of a magnetic field generated by side force coil 1800 and permanent magnet unit 1704 to move permanent magnet unit 1704 along the direction of arrow 1810.

Figure 19:
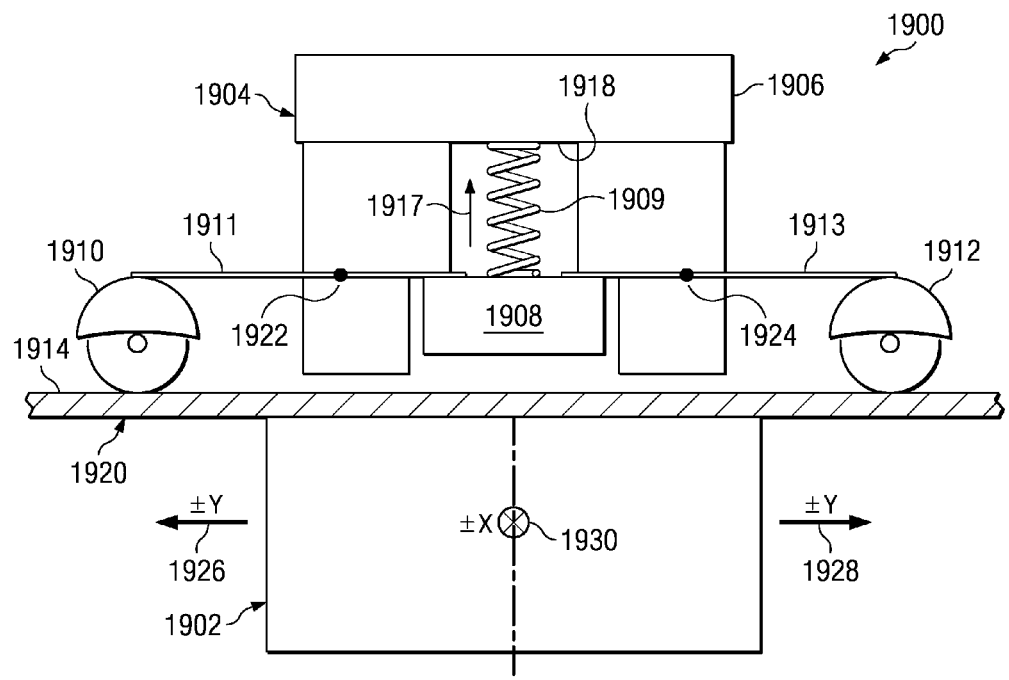
FIG. 19 is a diagram illustrating an electromagnetic clamping system in accordance with an advantageous embodiment.

With reference now to FIG. 19, a diagram illustrating an electromagnetic clamping system is depicted in accordance with an advantageous embodiment. Electromagnetic clamping system 1900 is an example of one implementation for electromagnetic clamping system 300 in FIG. 3.

In this example, electromagnetic clamping system 1900 may include electromagnetic clamping device 1902 and permanent magnet unit 1904. Permanent magnet unit 1904 may include housing 1906, permanent magnet 1908, wheel 1910, wheel 1912, spring 1909, lever 1911, and lever 1913. As illustrated, permanent magnet unit 1904 may be in a moving mode. In this mode, wheel 1910 and wheel 1912 may contact surface 1914 of workpiece 1920. Permanent magnet 1908 may be biased away from surface 1914 of workpiece 1920 by spring 1909.

Spring 1909 may be connected to interior surface 1918 of housing 1906 and permanent magnet 1908. Spring 1909 biases permanent magnet 1908 in the direction of arrow 1917. When permanent magnet 1908 is biased away from surface 1914 of workpiece 1920, levers 1911 and 1913 may pivot about pivot points 1922 and 1924 to bias wheel 1910 and wheel 1912 onto surface 1914 of workpiece 1920.

This configuration of permanent magnet unit 1904 may allow permanent magnet unit 1904 to be moved by electromagnetic clamping device 1902. Electromagnetic clamping device 1902 may generate magnetic forces in the direction of arrows 1926, 1928, and 1930 to move permanent magnet unit 1904 in similar directions on surface 1914 of workpiece 1920.

In this example, arrow 1926 points to the left of electromagnetic clamping device 1902, arrow 1928 points to the right of electromagnetic clamping device 1902, and arrow 1930 points outward from electromagnetic clamping device 1902. Of course, electromagnetic clamping device 1902 also may be physically moved to cause permanent magnet unit 1904 to move in these different directions.

Figure 20:
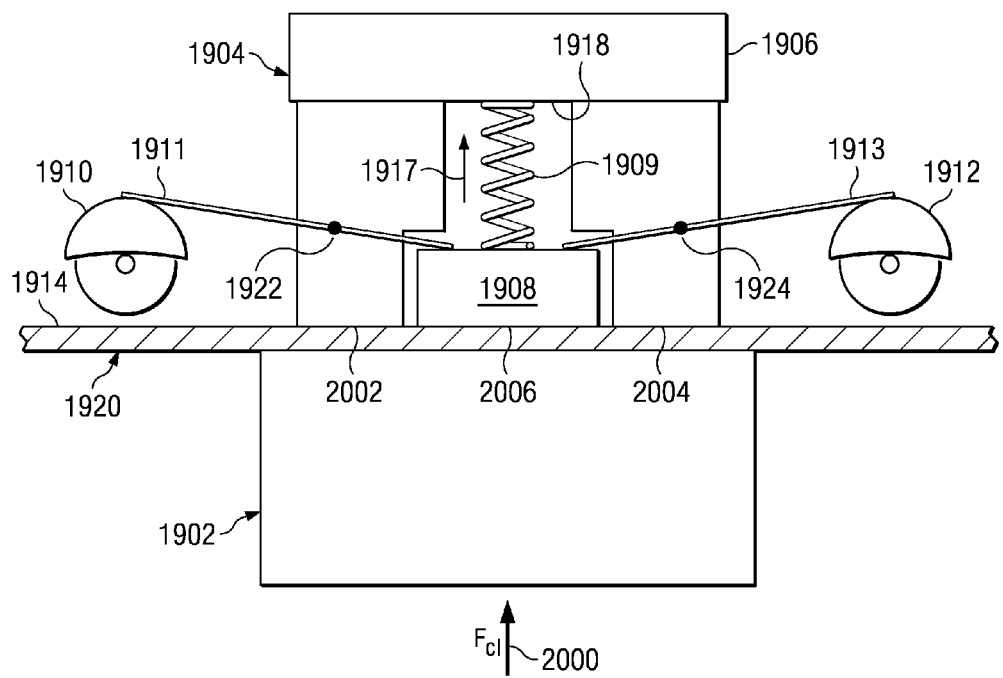
FIG. 20 is a diagram illustrating an electromagnetic clamping system in accordance with an advantageous embodiment.

With reference now to FIG. 20, a diagram illustrating an electromagnetic clamping system is depicted in accordance with an advantageous embodiment. In this example, permanent magnet unit 1904 may be in a fixed mode.

In this mode, electromagnetic clamping device 1902 may generate a clamping force as illustrated by arrow 2000 to pull permanent magnet 1908 to surface 1914 of workpiece 1920 to clamp workpiece 1920 between permanent magnet unit 1904 and electromagnetic clamping device 1902.

When permanent magnet 1908 is biased to contact surface 1914, wheels 1910 and 1912 may no longer be biased toward surface 1914. In this manner, permanent magnet unit 1904 may be placed into a fixed mode to perform various operations. In this example, wheels 1910 and 1912 provide a low friction surface, while surfaces 2002 and 2004 on housing 1906, and surface 2006 on permanent magnet 1908 provide a high friction surface. As a result, workpiece 1920 may be secured between permanent magnet unit 1904 and electromagnetic clamping device 1902.

Figure 21:
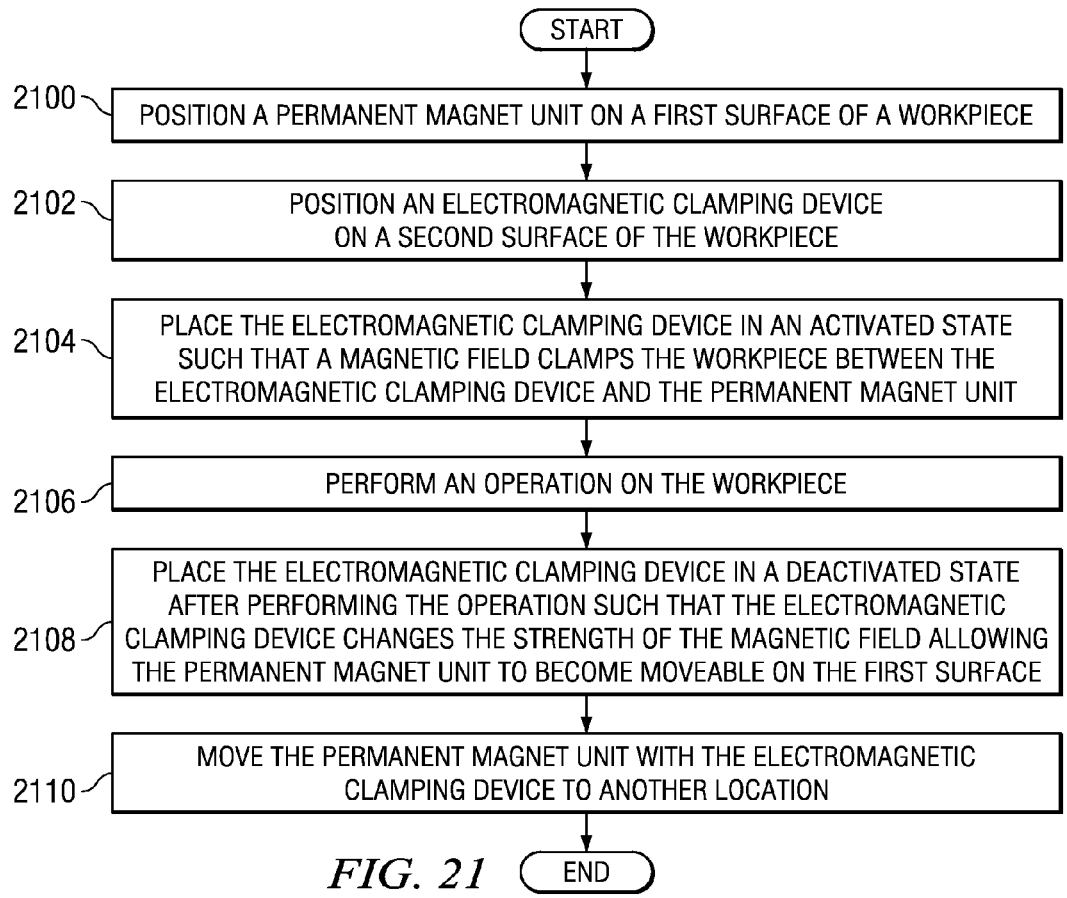
FIG. 21 is a flowchart of a process for performing an operation on a workpiece in accordance with an advantageous embodiment.

With reference now to FIG. 21, a flowchart of a process for performing an operation on a workpiece is depicted in accordance with an advantageous embodiment. The process illustrated in FIG. 21 may be implemented using an electromagnetic clamping system, such as electromagnetic clamping system 300 in FIG. 3.

The process may begin by positioning permanent magnet unit 304 on first surface 326 of workpiece 308 (operation 2100). The process positions electromagnetic clamping device 302 on second surface 328 of workpiece 308 (operation 2102). Second surface 328 may oppose first surface 326 of workpiece 308. The process may place electromagnetic clamping device 302 in an activated state, such that magnetic fields 320 and 322 clamp workpiece 308 between electromagnetic clamping device 302 and permanent magnet unit 304 (operation 2104).

The process may then perform an operation on workpiece 308 using end effector 306 (operation 2106). This operation may be, for example, without limitation, a drilling operation, a sealing operation, a fastening operation, and/or some other suitable operation. Operation 2106 may employ a number of different operations for assembling a structure and/or object from a number of parts. This operation may include, for example, sealing, clamping, drilling, and installing fasteners to assemble the structure from two or more parts. With the different advantageous embodiments, other operations that may have required separating the parts after drilling and performing deburring, clean up, and then adding sealant may be avoided.

The process may place the electromagnetic clamping device in a deactivated state after performing the operation, such that the electromagnetic clamping device changes the strength of magnetic fields 320 and 322 allowing permanent magnet unit 304 to become moveable on first surface 326 (operation 2108).

The process may then move permanent magnet unit 304 with electromagnetic clamping device 302 to another location (operation 2110), with the process terminating thereafter. At this point, the process may be repeated to perform another operation on workpiece 308. The movement of the permanent magnet unit 304 in operation 2110 may be performed by moving electromagnetic clamping device 302 and/or generating magnetic fields 320 and 322 with a force capable of moving permanent magnet unit 304 along the surface of workpiece 308.

The different operations illustrated in FIG. 21 are provided for purposes of illustrating one manner in which a clamping process may be performed on workpiece 308 to perform an operation on workpiece 308. In other advantageous embodiments, other operations in addition to or in place of the ones illustrated may be performed. For example, without limitation, instead of performing a single operation in operation 2106, multiple operations may be performed. For example, without limitation, a hole may be drilled in the workpiece and then a fastener may be placed into the hole in the workpiece.

Figure 22:
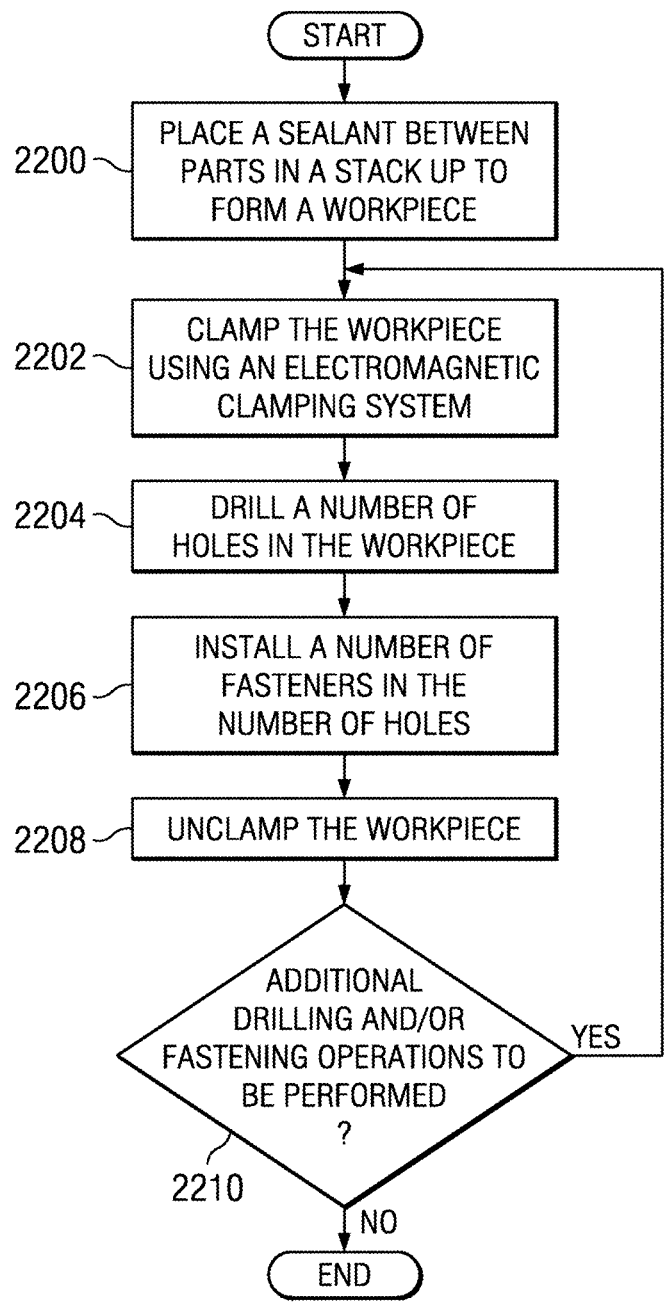
FIG. 22 is a flowchart of an assembly process in accordance with an advantageous embodiment.

With reference now to FIG. 22, a flowchart of an assembly process is depicted in accordance with an advantageous embodiment. The assembly process illustrated in FIG. 22 may be implemented using an electromagnetic clamping system, such as electromagnetic clamping system 300 in FIG. 3.

The process may begin by placing sealant between parts in a stack up to form workpiece 308 (operation 2200). The process clamps workpiece 308 using electromagnetic clamping system 300 (operation 2202). The process drills a number of holes in workpiece 308 (operation 2204).

Next, a number of fasteners may be installed in the number of holes (operation 2206). The workpiece may then be unclamped (operation 2208). A determination may then be made as to whether additional drilling and/or fastening operations are to be performed (operation 2210). If additional drilling and/or fastening operations are needed, clamping system 300 may be moved to another location on the workpiece, and the process returns to operation 2202. If additional drilling and/or fastening operations are not needed in operation 2210, the process may terminate.

Operations 2204 and 2206 may be performed sequentially or concurrently. In other words, each time a hole is drilled, a fastener may be installed. In other advantageous embodiments, all the holes may be drilled prior to installing fasteners.

Thus, the different advantageous embodiments provide a method and apparatus for performing operations on a workpiece. In the different advantageous embodiments, a permanent magnet unit, an end effector, and an electromagnetic clamping device may be used to perform the different operations.

With the different advantageous embodiments, the use of steel plates and the fatigue that the steel plates may cause may be avoided. Further, the different advantageous embodiments provide a capability to move a permanent magnet unit through magnetic forces generated by an electromagnetic clamping device. In this manner, only a single operator may be needed to perform different operations. For example, without limitation, an operator may operate and move the electromagnetic clamping device with the end effector on one side of the workpiece without requiring another operator to be present on the opposite side. This type of capability may be especially useful when the type of workpiece may limit access to both sides of the workpiece.

As a result, one or more of the different advantageous embodiments may be employed in a manner to clamp parts that may eliminate gaps between parts. Further, the different advantageous embodiments may be used for performing various assembly operations. These assembly operations may include, for example, without limitation, squeezing sealant applied to part interfaces, enabling no burrs between parts of clamp up during drilling, and other suitable operations.

As described above, the different advantageous embodiments may employ an electromagnetic clamping device to pull a permanent magnet on an opposite side of the part towards the electromagnetic clamping device. Further, in some advantageous embodiments, the electromagnetic clamping device may move the permanent magnet, which may have an end effector attached, sideways. This movement may be performed by reversing the electromagnetic polarity, generating a low repelling normal flow of force, and towing the permanent magnet with reduced friction during side motion. Also, additional coils may be present within the electromagnetic clamping device to employ Lorenze forces to move the permanent magnet sideways.

The description of the different advantageous embodiments has been presented for purposes of illustration and description, and is not intended to be exhaustive or limited to the embodiments in the form disclosed. For example, without limitation, the different advantageous embodiments have been described with respect to clamping workpieces in the form of aircraft parts.

Other advantageous embodiments may be applied to clamping parts and/or components for other structures other than aircraft. For example, other advantageous embodiments may be employed to clamp workpieces for automobiles, spacecraft, submarines, molds, and other suitable structures. Many modifications and variations will be apparent to those of ordinary skill in the art. Further, different advantageous embodiments may provide different advantages as compared to other advantageous embodiments.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for performing an operation on a workpiece, the method comprising:
   positioning a permanent magnet unit on a first surface of the workpiece, the permanent magnet unit attached to a housing via a spring configured to bias the permanent magnet unit towards the housing, the permanent magnet unit further including:
   a number of wheels, including a first wheel and a second wheel;
   a first lever having a first end and a second end, the first lever connecting to the housing at a first pivot point, and also connecting to the permanent magnet unit at about the first end, the second end of the first lever connecting to the first wheel:
   a second lever having a third end and a fourth end, the second lever connecting to the housing at a second pivot point and also connecting to the permanent magnet at about the third end and further connecting to the permanent magnet unit opposite the first lever, the fourth end of the second lever connecting to the second wheel; and
   an end effector, attaching to the housing between the first wheel and the second wheel;
   positioning an electromagnetic clamping device on a second surface of the workpiece, wherein the first surface opposes the second surface, the electromagnetic clamping device having an activated state and a deactivated state;
   placing the electromagnetic clamping device in an activated state such that a number of forces caused by a magnetic field clamps the workpiece between the electromagnetic clamping device and the permanent magnet unit; and
   performing an operation on the workpiece using the end effector.

2. The method of claim 1 further comprising:
   placing the electromagnetic clamping device in a deactivated state after performing the operation;
   pulling the permanent magnet unit, using the spring, away from the electromagnetic clamping device and towards the housing;
   pivoting the first lever and the second lever, correspondingly about the first pivot point and the second pivot point as the permanent magnet unit is pulled away from the electromagnetic clamping device;
   lowering the first wheel and the second wheel, using the first lever and the second lever respectively, towards the workpiece; and
   moving the permanent magnet unit with the electromagnetic clamping device on the first surface.

3. The method of claim 2, wherein the moving step comprises:
   moving the electromagnetic clamping device, wherein the electromagnetic clamping device pulls the permanent magnet unit.

4. The method of claim 2, wherein the moving step comprises:
   generating another magnetic field to cause a side force to move the permanent magnetic unit on the first surface.

5. The method of claim 2, the housing having one of a same material throughout and a combination of material, wherein the housing material comprises at least one of non-ferrous materials, aluminum, plastic composites, magnetic materials, iron, and steel.

6. The method of claim 2, wherein the first wheel and the second wheel are caster wheels.

7. The method of claim 6, wherein the first wheel and the second wheel are low friction surfaces made of low friction materials.

8. The method of claim 7, wherein the low friction surfaces comprise fluoropolymer materials.

9. The method of claim 1, wherein the workpiece comprises two components.

10. The method of claim 1, wherein the operation is selected from at least one of a drilling operation and a fastening operation.

11. A method for performing an operation on a workpiece having at least two components with an electromagnetic clamping system, the method comprising:
   positioning a permanent magnet unit in the electromagnetic clamping system on a first surface of the workpiece, the permanent magnet unit attached to a housing via a spring configured to bias the permanent magnet unit towards the housing, the permanent magnet unit further including:
   a first lever having a first end and a second end, the first lever connecting to the housing at a first pivot point, and also connecting to the permanent magnet unit at about the first end, the second end of the first lever connecting to a first wheel;
   a second lever having a third end and a fourth end, the second lever connecting to the housing at a second pivot point and also connecting to the permanent magnet at about the third end and further connecting to the permanent magnet unit opposite the first lever, the fourth end of the second lever connecting to a second wheel; and
   an end effector attaching to the housing between the first wheel and the second wheel;
   positioning an electromagnetic clamping device in the electromagnetic clamping system on a second surface of the workpiece, wherein the first surface opposes the second surface, the electromagnetic clamping device having an activated state and a deactivated state;
   placing the electromagnetic clamping device in an activated state such that a number of forces caused by a magnetic field clamps the workpiece between the electromagnetic clamping device and the permanent magnet unit;
   performing the operation on the workpiece using the end effector, wherein the operation is selected from at least one of a drilling operation and a fastening operation;
   placing the electromagnetic clamping device in a deactivated state after performing the operation;
   pulling the permanent magnet unit, using the spring, away from the electromagnetic clamping device and towards the housing;

pivoting the first lever and the second lever, correspondingly about the first pivot point and the second pivot point as the permanent magnet unit is pulled away from the electromagnetic clamping device;

lowering the first wheel and the second wheel, using the first lever and the second lever respectively, towards the workpiece; and moving the permanent magnet unit with the electromagnetic clamping device by at least one of moving the electromagnetic clamping device, wherein the electromagnetic clamping device pulls the permanent magnet unit, and generating another magnetic field causing a side force to move the permanent magnetic unit on the first surface.

12. The method of claim 11, housing having one of a same material throughout and a combination of material, wherein the housing material comprises at least one of non-ferrous materials, aluminum, plastic composites, magnetic materials, iron, and steel.

13. The method of claim 11, wherein the first wheel and the second wheel are caster wheels.

14. The method of claim 11, wherein the first wheel and the second wheel are low friction surfaces made of low friction materials.

15. The method of claim 14, wherein the low friction materials are fluoropolymers.

* * * * *